United States Patent
Itada et al.

(10) Patent No.: US 6,638,602 B2
(45) Date of Patent: Oct. 28, 2003

(54) ADHESIVE WRAPPING FILM

(75) Inventors: Mitsuyoshi Itada, Suzuka (JP); Reiko Takahashi, Suzuka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/867,393

(22) Filed: May 31, 2001

(65) Prior Publication Data

US 2002/0058127 A1 May 16, 2002

(30) Foreign Application Priority Data

Sep. 4, 2000 (JP) .................................. 2000-267615

(51) Int. Cl.$^7$ ............................. B32B 3/00; B32B 15/04
(52) U.S. Cl. ..................... 428/172; 428/161; 428/213; 428/343; 428/906
(58) Field of Search ............................... 428/156, 172, 428/161, 163, 212, 353, 343, 906

(56) References Cited

U.S. PATENT DOCUMENTS 4,959,265 A * 9/1990 Wood et al. ................. 428/343
5,589,246 A * 12/1996 Calhoun et al. ............. 428/120
6,099,940 A * 8/2000 Hamilton et al. ........... 428/178

FOREIGN PATENT DOCUMENTS

JP          7-96964     4/1995
JP         11-501895    2/1999

* cited by examiner

*Primary Examiner*—Donald J. Loney
(74) *Attorney, Agent, or Firm*—Birch, Stewart, Kolasch & Birch, LLP (57) ABSTRACT

An adhesive wrapping film having a continuous tackifier layer (A) on at least one side surface of a substrate layer (B) whose surface has a concavo-convex form, wherein a thickness of the tackifier layer at the concave portion of the substrate layer is larger than that at the convex portion of the substrate layer, and a thickness of the substrate layer $B_{AV}$, a thickness of the tackifier layer at the concave portion of the substrate layer $A_{max}$, a ten-point average roughness of the surface of the tackifier layer corresponding to a height of the convex portion of the tackifier layer $R_z^{(A)}$, and a ten-point average roughness of the surface of the substrate layer corresponding to a height of the convex portion of the substrate layer $R_z^{(B)}$ satisfy a relation of the following conditional expressions (1) and (2):

(1) $A_{max} < R_z^{(B)} < B_{AV}$
(2) $R_z^{(A)} < R_z^{(B)}$.

10 Claims, 4 Drawing Sheets

ADHESIVE WRAPPING FILM

This nonprovisional application incorporates by reference the subject matter of application No. 2000-267615 filed in JAPAN on Sep. 4, 2000, on which a priority claim is based under 35 U.S.C. § 119(a).

BACKGROUND ART

1. Field of the Invention

The present invention relates to a wrapping film suitably used as a wrapping film for packaging use, particularly for household use. More specifically, it relates to an adhesive wrapping film satisfactory in its adhesive sealing property and drawing-out property and superior in its visual recognizability of contents.

2. Description of the Related Art

A wrapping film for household use is employed for over-wrapping foods put on a vessel for the purpose of mainly storing foods in a refrigerator or a freezer or heating foods in a microwave. For this reason, for example, it is required that the wrapping film has transparency and a moderate modulus of elasticity, the film is stable so as to be free from perforation, welding to a vessel or self-deformation even when subjected to heating in a microwave oven or the like, and further the film exhibits a moderate self-adhesive sealing property or adhesive sealing property against a vessel within a range of from a low temperature to a high temperature.

As a commercially available wrapping film for household use, there are a film composed mainly of polyvinylidene chloride based resin, which is most easily and extensively used, a film composed mainly of polyethylene based resin, which is extensively used in spite of remarkable inferiority in its wrapping qualification, and others composed mainly of plasticized polyvinyl chloride based resin, poly 4-methylpentene-1 based resin or the like.

Generally speaking, the wrapping film is rolled round a paper tube, and in such a state (which is called a rolled wrapping film) received in a decorated box to be used in a manner such that dinner vessels or the like are covered therewith by hand to perform a package. For this reason, the wrapping film is required to have a high adhesive sealing property, so that a content in a vessel, even if liquid, is not spilt in sending in or out of a refrigerator or the like, as well as a visual recognizability of wrapped goods (transparency of the wrapping film). Whereas, there has been left a problem in that when a self-adhesive sealing property of the rolled wrapping film is high, the film becomes difficult to be peeled from each other and results in cutting, when drawn out from the decorated box.

A wrapping film obtained in consideration of the problem is disclosed in JP-A 11-501895. Herein, there is proposed a wrapping film having a concavo-convex form on a surface of a substrate layer, wherein a size of the concavo-convex is larger than a thickness of said layer, and only the concave portion is partially filled with a tackifier. The wrapping film is described to satisfy both the adhesive sealing property and the drawing-out property at the same time. However, the wrapping film is found to exhibit a 180° peeling strength of not less than 1 oz/inch (=about 11 g/cm width) when applied with a compressive strength of not less than 0.1 psi (=about 7 g/cm$^2$), which is said to be "operation by users", and therefore, there is left a problem in that when a long length film is rolled round, it may happen that a rolling pressure of the film exceeds the compressive strength applied by users, and as a result, it is difficult to satisfy both the adhesive sealing property and the drawing-out property at a practical level.

In addition, from the fact that a size of the concavo-convex formed on the surface of the substrate layer is larger than the thickness of the substrate layer, and moreover the tackifier is discontinuously applied on said substrate layer (no tackifier is present on the convex portion of the concavo-convex of the substrate layer), there is also left a problem in that a space is easily produced as far as the compressive strength by users is not applied to both the film and materials to be bonded under a perfect condition, and as a result, the content, particularly if liquid, is easily spilt. Further, the scattering of light promotes loss of transparency, and therefore transparency of the wrapping film becomes insufficient to create a severe problem on the visual recognizability of the wrapped goods.

SUMMARY OF THE INVENTION

An object of the present invention is to provide a wrapping film, which is superior in its drawing-out property without detriment to its high adhesive sealing property, and which is satisfactory in its visual recognizability of wrapped goods.

The present inventors have undertaken extensive studies from three viewpoints of the adhesive sealing property, the drawing-out property and the transparency, and as a result, it has been found that a film having a fixed relation among a concavo-convex size of a substrate layer, a concavo-convex size of a tackifier layer and a thickness of a tackifier layer can exhibit the most suitable wrapping qualification. Thereby, the present invention has been obtained.

The present invention is as follows:

An adhesive wrapping film having a continuous tackifier layer (A) on at least one side surface of a substrate layer (B) whose surface has a concavo-convex form, wherein a thickness of the tackifier layer at the concave portion of the substrate layer is larger than that at the convex portion of the substrate layer, and a thickness of the substrate layer $B_{AV}$, a thickness of the tackifier layer at the concave portion of the substrate layer $A_{max}$, a ten-point average roughness of the surface of the tackifier layer corresponding to a height of the convex portion of the tackifier layer $R_Z^{(A)}$, and a ten-point average roughness of the surface of the substrate layer corresponding to a height of the convex portion of the substrate layer $R_Z^{(B)}$ satisfy a relation of the following conditional expressions (1) and (2):

(1) $A_{max} < R_Z^{(B)} < B_{AV}$ (2) $R_Z^{(A)} < R_Z^{(B)}$.

That is, the present invention comprises a combination of the following three conditions.

1) The film in accordance with the present invention is provided with a concavo-convex on one or both side surfaces of a substrate layer (B) and a continuous tackifier layer (A) formed on said substrate layer to form a lamination structure, wherein a ten-point average roughness of the concavo-convex ($R_Z^{(B)}$) is smaller than a thickness of said substrate layer ($B_{AV}$).

2) On the concavo-convex surface of said substrate layer is provided a tackifier layer having a thickness ($A_{max}$) and a ten-point average roughness ($R_Z^{(A)}$), which are smaller than the ten-point average roughness of the concavo-convex of said substrate layer ($R_Z^{(B)}$).

3) A thickness of the tackifier layer at a concave portion of said substrate layer is larger than that of the tackifier layer at a convex portion thereof. That is, the thickness of the tackifier layer is formed so as to be thickest at a valley portion of the concavo-convex and minimum at a summit portion thereof, provided that the tackifier layer is a continuous layer.

The most different point between the present invention and the prior art is that a specific concavo-convex structure is provided on the surface of a substrate layer, a tackifier layer having a thickness smaller than a height of the concavo-convex is provided on both the concave and convex portions of the surface of the substrate layer, and moreover a thickness of the tackifier layer at the concave portion is smaller than that of the tackifier layer on the convex portion, whereby the structure is made so as to have a high tackifying concave portion and a low tackifying convex potion which are present as a mixture.

The film having the above-mentioned structure can exhibit a satisfactory visual recognizability of wrapped goods. In other words, it is possible to make a clouding degree (Haze), which is an index of transparency of a film, from more than 0% to less than 50%. Further, the film can exhibit a drawing-out property free from blocking when a rolled film is drawn out, that is, the film can exhibit a drawing-out force of not more than 80 g/300 mm width without detriment to a high adhesive sealing property, whereby both properties conflict with each other can be satisfied.

DESCRIPTION OF THE PREFERRED EMBODIMENTS

The present invention is explained in detail as follows.

A resin for the substrate layer used for the film in accordance with the present invention is not particularly limited as far as it is usable for packaging foods. For example, there is enumerated a resin composition comprising as a main component at least one member selected from polyolefin resins (PO) such as polyethylene based resins (for example, HDPE, LDPE and LLDPE), polypropylene based resins (PP), polybutene-1 based resins (PB) and poly-4-methylpentene-1 based resins; modified polyolefin resins (modified PO) such as ethylene-vinyl acetate copolymer resins (EVA), ethylene-methyl methacrylate copolymer resins (EMA) and ethylene-vinyl alcohol copolymer resins (EVOH); polyester resins partially having an aromatic component such as polyethylene telephthalate (including modified products thereof) based resins (PET and others) and polybutylene telephthalate (including modified products thereof) based resins (PBT and others), and polyester resins having an aliphatic component such as polylactate based resins and polyglycolate based resins (collectively referred to as PEST); chlorine resins such as polyvinylidene chloride based resins (PVDC) and polyvinyl chloride based resins (PVC); α-olefin-carbon monoxide copolymer resins (including their hydrogenated resins); α-olefin (including ethylene and others)-styrene copolymer resins (including their hydrogenated resins); ethylene-cyclic hydrocarbon compound copolymer resins (including their hydrogenated resins); polyamide resins (Ny); and caprolactone resins. From a viewpoint of heat resistance, polyethylene resins (HDPE, LLDPE and others), polypropylene resins (PP), polyamide resins (Ny) and polyester resins are preferred. As far as the effects of the present invention are not impaired, it is permitted to mix these resins with a known additive such as antioxidants, photostabilizers, antistatic agents, antifogging agents, coloring agents and lubricants, or to apply a known surface treating such as a radiation irradiation treatment including corona discharge treatments, flame treatments and electron plasma treatments, and an ion-etching treatment.

For the substrate layer, it is permitted to use a layer of the above-mentioned resin in a form of a single layer or a laminate of the layers the same or different in their material. Particularly from a viewpoint of molding facility to give the concavo-convex form on the substrate (particularly when the concavo-convex form is provided only on one side surface thereof), it is recommended to use both a layer of a material having a relatively low Vicat softening point (a softening point according to ASTM-D-1525-65T) as the concavo-convex-carrying layer and a layer of a material having a Vicat softening point (a softening point according to ASTM-D-1525-65T) higher than that of the concavo-convex layer as the layer to be laminated thereon (for example, a core layer), and to obtain a laminate structure composed of these layers.

From a viewpoint of processability including the concavo-convex formation and others, and further from an economical point of view, particularly preferred is a single layer of polyethylene based resin or polypropylene based resin, or a laminate having said single layer as an outer layer and a layer of a resin composition having a Vicat softening point higher by at least 10° C. than that of the outer layer as a core layer.

A thickness of the substrate layer ($B_{AV}$) is preferably from about 10 to 50 μm. When the thickness of the substrate layer ($B_{AV}$) is less than 10 μm, it may happen that the film is made weak-kneed to cause a problem such as self-adhesion at the time of drawing-out or wrapping of a vessel or the like. Whereas, when it exceeds 50 μm, it may happen that a diameter of the rolled product is made large to cause disadvantages from an economical point of view.

Incidentally, the thickness of the substrate layer ($B_{AV}$) can be measured using an optical microscope as well as a contact thickness gage including a dial gage and others. More specifically, with respect to 10 measurement pieces of about 20 mm square cut at every interval of about 50 by 50 mm of the projected plane of the substrate layer, the measurement is carried out by a cross section observation vertical to the projected plane (in both the longitudinal and lateral directions). The maximum portion and the minimum portion of the thickness in a vertical direction of the substrate layer are measured using, for example, an exact size scale provided to an eye lens, provided that a sight is fixed in a horizontal direction, and it is permitted to use, as the thickness of the substrate layer ($B_{AV}$), an average value (an average value with respect to the longitudinal and lateral cross sections of each measurement piece) of ½ of the sum of one average value relating to the convex thickness of from the maximum convex thickness to 5th convex thickness in the substrate layer and the other average value relating to the concave thickness of from the minimum concave thickness to 5th concave thickness in the substrate layer, whereby the value obtained in such a manner becomes almost equal to a thickness of the substrate layer before the concavo-convex formation.

As a shape of the convex portion in the concavo-convex present on the surface of the substrate in the present invention, there are enumerated, for example, shapes of cones and polygonal pyramids such as circular cone, square pyramids, trapezoid pyramids and hexagonal pyramids, their conical trapezoids, circles, polygons such as triangles, and granules. Particularly preferred is a shape of polygonal conical trapezoid.

How to arrange these convex portions is not particularly limited, and there are enumerated arrangements of a random form, a cellular form, a linear form and a complex thereof. From a viewpoint of response facility of the film peeling strength to a contact pressure (contact pressure reliability), an arrangement of a linear form or a cellular form is preferred. Particularly, a parallel or staggered arrangement is preferred.

With respect to the most preferred embodiment for the shape of the convex portion and the arrangement thereof, it is recommendable to apply a sea-island pattern wherein islands of the convex portions having a shape of polygonal conical trapezoid are arranged on the sea of the continuous concave portion, in a parallel or staggered form. This "sea-island pattern" includes not only a structure wherein the sea (continuous concave portion) is completely continuous, and all of the islands (discontinuous convex portions) are independently of one another scattered on the sea, but also either a state wherein the islands are partially united with one another or a state wherein the sea is partially discontinued due to the union of the islands. In the last case, it is recommendable to control an area of the discontinued sea portion not as to exceed about 10% of the whole area.

It is necessary that the ten-point average roughness of the concavo-convex of the substrate layer ($R_Z^{(B)}$)) in the concavo-convex-carrying film in accordance with the present invention is smaller than the thickness of the substrate layer ($B_{AV}$) and larger than a thickness of the tackifier layer mentioned below. A preferred specific value of the ten-point average roughness ($R_Z^{(B)}$) is from 5 to 50 $\mu$m. When the roughness is within such a range, it is easy to satisfy both the adhesive sealing property and the drawing-out property at the same time because a size of the concavo-convex is suitable. Moreover, when rolled round, the film in accordance with the present invention is handy because a diameter of the rolled body is suitable. From a viewpoint of the facility of processing the concavo-convex, a roughness of from 6 to 40 $\mu$m is more preferable.

An average interval of the concavo-convex of the substrate layer ($S_M^{(B)}$) is preferably from 10 to 500 $\mu$m. When the interval is within such a range, it is easier to satisfy both the adhesive sealing property and the drawing-out property at the same time because tackifying degrees between the tackifier layers provided on both the convex and concave portions are well balanced. A more preferable average interval of the concavo-convex of the substrate ($S_M^{(B)}$) is from 100 to 300 $\mu$m from a viewpoint of the facility of processing the concavo-convex.

The roughness of the concavo-convex on the surface of the substrate layer and variation thereof can be determined using, for example, a surface configuration observation device (for example, SAS2010 manufactured by Meishin Koki Co., Ltd.) and a scanning probe microscope three-dimensional surface observation device (for example, SPM9500J manufactured by Shimadzu Corporation) as well as an optical microscope, a laser microscope and an electron microscope. That is, a ten-point average roughness of a concavo-convex $R_Z$ described in JIS-B0660 is measured to know the roughness (height) of the concavo-convex, and an average interval of a concavo-convex $S_M$ described in the same JIS is measured to know the variation of the convex portion. More specifically, with respect to 10 measurement pieces of about 20 mm square cut at an interval of about 50 by 50 mm of the projected plane of the substrate layer, measurements using a tracer detector or a non-contact detector showing a measurement value similar to that of the tracer detector (for example, SAS2010 : FOCODYN manufactured by Meishin Koki Co., Ltd.) according to JIS-B0660 are carried out to know respective values of the ten-point average roughness of the concavo-convex $R_Z$ and respective values of the average interval of the concavo-convex $S_M$, from which values an average value with respect to respective measurement pieces is obtained to determine the roughness and the variation thereof.

As a method for processing the surface of the substrate layer into the concavo-convex form, there are enumerated, for example, a method wherein a roll having a desired concavo-convex shape on its surface or a flat plate of a concavo-convex surface is used to carry out a mold-press or a rolling, a method wherein a female mold having a desired concavo-convex shape is used to carry out a processing according to an injection molding or a melt casting, and a lithography method wherein the surface of the film is subjected to etching. Of these, preferred is a method wherein the film is subjected to rolling with a roll or flat plate having a concavo-convex shape on its surface. As specific examples of a processing method of the roll or flat plate having a concavo-convex shape on its surface, there are enumerated, for example, a method of mechanical engraving and a method of Liga technology (abbreviation of X-ray Lithography Galvanik (=Electroforming) Ahformung (=Modeling)) according to which the processing is carried out using a photolithography with a metal- or ceramic-made very small mold and an X-ray.

A more preferable method for processing the surface of the substrate layer into the concavo-convex form is to use an embossing method, wherein the film is caught between a female mold of a metal-made cup roller having a desired fine concavo-convex form of, for example, not less than about 50 mesh (mesh means the number of intervals between the convex and the concave per inch), which is obtained according to such a processing method using the concavo-convex-carrying roll, and a rubber-made back-up roller, a metal-made, a plastic-made roller , a paper roller or the like, followed by pressure contact (rolling), whereby transfer of the desired concavo-convex form is performed to obtain a film whose surface has a desired concavo-convex form of the sea-island pattern in which the islands of the convex portions are arranged on the sea of the continuous concave portion.

In order to obtain the substrate film having the concavo-convex of the ten point average roughness and the average interval as defined in the present invention, for example, in the method of subjecting the film to rolling with the roll or flat plate having the concavo-convex on its surface, the ten point average roughness can be determined by controlling a pressure contact strength of the mold or selecting a material of the roll to be used for the pressure-contact, and the average interval can be determined by, for example, selecting a shape of the concavo-convex provided on the mold (for example, the concavo-convex interval of the mold).

As the tackifier used for the tackifier layer in the present invention, there are used those capable of adhering to a surface of a material to be bonded even under a very weak compressive strength of about $P = 0$ to $10$ $g/cm^2$, for example, by light finger-pushing pressure or by tare, using none of water, a solvent, heat or the like, and capable of easily peeling off without stain of a surface of a material to be bonded at the time of peeling-off. For example, there are enumerated a resin comprising as a main component at least one member selected from rubber-based tackifiers, acrylic tackifiers, vinyl ether-based tackifiers, silicone-based tackifiers, heat sensitive tackifiers having a delayed tackifying property and the like, or a resin composition comprising said tackifier and a known additive such as, for example, antioxidants, photostabilizers, antistatic agents, anti-fogging agents and coloring agents, which can be added in a manner such that the effects of the present invention are not impaired.

As the rubber-based tackifiers, there is enumerated, for example, a tackifying elastomer comprising at least one member selected from natural rubber mainly comprising cis-1,4-polyisoprene; synthetic rubber mainly comprising styrene-butadiene rubber (SBR), polyisobutylene, butyl rubber or their hydrogenated products; and block rubber mainly comprising styrene-butadiene-styrene copolymer rubber (SBS), styrene-isoprene-styrene copolymer rubber (SIS) or their hydrogenated products. Additionally, there is enumerated a product blended with a tackiness-imparting agent such as rosin resin, terpene resin, petroleum resin, cumarone indene resin and the like, which are each a thermoplastic resin liquid or solid at room temperature, namely an amorphous oligomer (mean molecular weight polymer of dimer or more) having a molecular weight of from some hundreds to about ten thousands, a mineral oil such as paraffin oil and the like, and a softening agent such as liquid polybutene, liquid polyisobutylene, liquid polyacrylate and the like.

As the acrylic tackifiers, there is enumerated, for example, a tackifying reaction product obtained by reaction among a main monomer typified by an acrylic acid alkyl ester, which usually gives a homopolymer low in its Tg and which is capable of imparting tackiness, a comonomer which is copolymerizable with the main monomer and which is capable of increasing Tg to impart flocculation, such as, for example, an acrylic acid ester having a lower alkyl group, methacrylic acid alkyl ester, vinyl acetate, styrene and acrylonitrile, a carboxyl group-containing monomer such as, for example, acrylic acid and methacrylic acid (acrylate and the like), and a monomer containing a functional group such as a hydroxyl group, an epoxy group, an amino group and the like, which monomer serves to impart tackiness and perform a cross-linking. The reaction product may be, if desired, blended with the above-mentioned tackiness imparting agent and softening agent or the like.

As the vinyl ether-based tackifiers, there are enumerated, for example, homopolymers of vinyl methyl ether, vinyl ethyl ether, vinyl isobutyl ether and the like, and copolymers (tackifying elastomers) thereof with an acrylate. Said tackifiers may be, if desired, blended with the above-mentioned tackiness imparting agent and softening agent or the like.

As the silicone-based tackifiers, there are enumarated, for example, polymers (or tackifying elastomers) having a remaining silanol group (SiOH) at an end of the resulting polymer chain, which polymers include high molecular weight polydimethylsiloxane and polydimethyldiphenylsiloxane as their typical examples. Said tackifiers may be, if desired, blended with the above-mentioned tackiness imparting agent and softening agent or the like.

The heat sensitive tackifiers having a delayed tackifying property are those exhibiting no tackiness (or low tackiness) at room temperature, but when heated, the tackifiers exhibit tackiness which can be maintained for a long period of time even after removing the heating source, and preferable examples thereof includes the following (a) to (c).

(a) A composition comprising a thermoplastic substance such as, for example, natural rubber subjected to graft-polymerization with a vinyl based monomer, and a heat fusible substance (a solid plasticizer and a plasticizer-containing microcapsule) such as, for example, dicyclohexyl phthalate, or a blend of said composition with a tackiness imparting agent such as, for example, rosin ether (refer to JP-A-10-338865).

(b) A tackifier composition having a sea-island structure, in which a non-tackifying component and a tackifying component serve as the sea and island, respectively, before applying a heat-treatment, which sea and island are reversed each other by applying a heat-treatment, and which composition is prepared by obtaining a mixture of a non-tackifying component such as a water-soluble methyl methacrylate-styrene-acrylic acid copolymer neutralized with aqueous ammonia, and a tackifying component such as an emulsion-polymerization product composed mainly of a (meth)acrylic acid ester having Tg of not higher than $-20°$ C., and blending the obtained mixture with a fine particle solid at room temperature (refer to JP-A-11-228927).

(c) That of a low tackiness obtained by stretching a tackifier layer, followed by rapid cooling, whereby a tackifying elastomer on the tackifier layer is subjected to orientation crystallization (JP-A-2000-502379).

Among these tackifiers, preferred are the rubber-based tackifiers, acrylic tackifiers and silicone-based tackifiers. When such tackifiers are used, a tackifying force can be controlled so as to be from about 150 to 300 g/cm width, the tackifying force being expressed in terms of 180° peeling strength, provided that the thickness is about 20 $\mu$m. Further, the rubber-based tackifiers obtained by blending synthetic (block) rubber with a petroleum resin, a mineral oil or the like are preferred from viewpoints of anti-aging property, quality stability and economy.

More specifically for the rubber-based tackifiers, from viewpoints of balance between strength of the tackifier itself and a tackifying force, transparency of respective materials to be blended and high transparency exhibited due to a desired compatibility, it is particularly preferred that at least one styrene-butadiene based rubber (SBR) selected from styrene-butadiene rubber, styrene-butadiene-styrene copolymer rubber and their hydrogenated products is used as the synthetic (block) rubber in an amount of from about 50 to 70% by weight, a mixture containing paraffin oil is used as the mineral oil in an amount of from about 3 to 20% by weight, and a C9 petroleum resin or its hydrogenated product is used as the petroleum resin in an amount of from about 47 to 10% by weight (corresponding to a balance of the synthetic rubber and the mineral oil), provided that the sum of blending weight ratios of the rubber based tackifier having a blending composition of synthetic (block) rubber/ petroleum resin/mineral oil is assigned to be 100% by weight. When the synthetic rubber is less than about 50% by weight, or the mineral oil exceeds about 20% by weight, it may happen that the tackifier layer is subjected to flocculation breakage, and when the synthetic rubber exceeds about 70% by weight, or the mineral oil is less than about 3% by weight, it may happen that the tackifying force is made insufficient or unstable.

The tackifier layer in the present invention is laminated on the concavo-convex surface of the substrate layer as mentioned above in the form of a continuous layer having a thickness smaller than the ten-point average roughness $R_Z$ of the concavo-convex on the substrate layer. For this reason, it can be said that the surface of the tackifier layer has an concavo-convex surface smoother than the concavo-convex on the substrate layer.

More specifically, a ten-point average roughness of the concavo-convex on the surface of the tackifier layer ($R_Z^{(A)}$) is smaller than the ten-point average roughness of the concavo-convex on the substrate layer ($R_Z^{(B)}$), preferably from 3 to 30 µm, more preferably from 3 to 20 µm. In the case where the ten-point average roughness is within 3 to 30 µm, both the adhesive sealing property and the drawing-out property can be easily satisfied at the same time because the concavo-convex on the surface of the tackifier layer is suitable. Further, the tackifier layer is laminated so as to conform to the concavo-convex surface of the substrate layer, and as a result, an average interval of the concavo-convex on the surface of the tackifier layer ($S_M^{(A)}$) is similar to the average interval of the concavo-convex on the surface of the substrate layer ($S_M^{(B)}$), that is, from about 10 to 500 µm, preferably from 100 to 300 µm. Incidentally, the ten-point average roughness of the surface of the tackifier layer ($R_Z^{(A)}$) can be measured in a manner similar to the measurement method of the concavo-convex configuration of the substrate layer.

In order to more safely obtain the effect of the above-mentioned ten-point average roughness ($R_Z^{(A)}$), it is recommended to arrange the tackifier layer in the present invention as follows.

That is, it is recommended to form a structure in a manner such that the tackifier layer is continuously formed on the surface of the concavo-convex on the substrate layer in a thickness of from 1 to 20 µm, and moreover the thickness at the convex summit portion (island) of the substrate layer is made from 1 to 3 µm preferably so as to obtain a 180° peeling strength (F) of from 10 to 100 g/cm width at the time of a high compressive strength, and the thickness at the concave portion (the sea) of the substrate layer is made from about 3 to 20 µm preferably so as to obtain a 180° peeling strength (F) of from 100 to 300 g/cm width at the time of a high compressive strength, whereby a 180° peeling strength (F) per unit width of the whole concavo-convex film is controlled to be from about 10 to 50 g/cm width at the time of a high compressive strength. In order to form such a structure, the maximum thickness of the tackifier layer at the concave portion is made about 2 times or more, preferably 3 times or more, the minimum thickness of the substrate layer at the convex portion. When the maximum thickness of the tackifier layer is 1 µm or more, a suitable tackifying force can be obtained even under a weak compressive strength, and moreover when the 180° peeling strength (F) is 10 g/cm width or more, such an effect can be easily obtained, and as a result, it is apt to increase the adhesive sealing property of the film. In addition, when the minimum thickness of the tackifier layer is 20 µm or less, the 180° peeling strength (F) fails to be too much at the time of a high compressive strength, and moreover when the 180° peeling strength (F) is 50 g/cm width or less, such an effect can be easily obtained, and as a result, even in the case where a long wrapping film is rolled round to result in increase of a rolling pressure, no problem occurs on the drawing-out property, and the tackifier layer is inhibited from either peeling off from the concavo-convex on the substrate layer or transferring to a material to be bonded. Incidentally, the tackifying force mentioned in the present invention is against a glass plate as is clear from a description in an evaluation method mentioned below.

The thickness of the tackifier layer (A) mentioned in the present invention is defined to be a measurement value of the concavo-convex height of the tackifier, which measurement is conducted with respect to a cross section of 10 measurement pieces of about 20 mm square cut at every interval of about 50 by 50 mm of the projected plane of the substrate layer using an optical microscope or the like.

Figure 1:
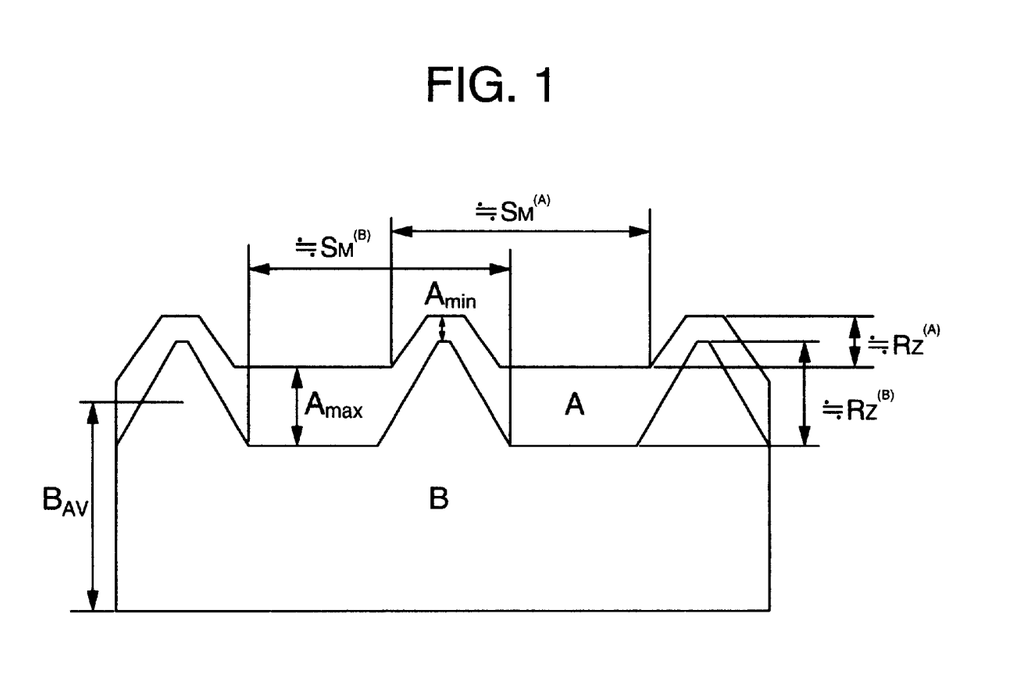
FIG. 1 is a view explaining a cross section of the concavo-convex film in accordance with the present invention.

More specifically, the projected plane of respective measurement pieces is vertically cut, and both the longitudinal and lateral directions of the cross section are observed to effect the measurement, provided that a sight is fixed in a horizontal direction. The measurement is conducted in a manner such that respective distances from a boundary portion between the substrate layer and the tackifier layer to the surface of the tackifier layer corresponding to the concave bottom portion and to the surface of the tackifier layer corresponding to the convex summit portion are measured using an exact size scale provided to an eye lens of the optical microscope, and respective average values of the concave and convex portions (average values with respect to the longitudinal and lateral cross sections of each measuring species) are calculated, and the thickness of the concave portion and that of the convex portion are $A_{max}$ in FIG. 1 and $A_{min}$ in FIG. 1, respectively.

A process for forming the tackifier layer in the present invention, which can be preferably applied, is explained as follows.

The above-mentioned tackifier component is, for example, dissolved in an organic solvent to obtain a solution, emulsified to obtain an emulsion or dissolved in water to obtain an aqueous solution, or a solid as such is melted to obtain a hot melt, followed by lamination on the substrate layer. Here, prior to the formation of the tackifier layer, it is more preferable that the concavo-convex surface of the substrate layer is subjected to, for example, corona discharge treatment to generate a polar group on the surface of the substrate layer, whereby adhesion between the tackifier and the substrate material can be strengthened much more. A lamination method of the tackifier layer is not particularly limited and appropriately selected depending upon what state of the tackifier is, for example, the emulsion, solution, hot melt or a reactive substance having a high solid content. A manner of the lamination includes those usually used for the lamination of tackifiers, and those by means of reverse roll coater, knife overroll coater, roll overroll coater, air knife coater, gravure coater, bar coater, direct coater, hot melt coater, die coater and the like can be applied.

It is recommendable to apply a coating manner by means of, for example, reverse roll coater, die coater or gravure coater, according to which a low viscosity fluid such as, for example, a solution obtained by dissolving the tackifier in a solvent (that having a tackifier concentration in the solvent of less than 50%) is coated so as to form a structure, in which the tackifier layer conforms to the concavo-convex structure of the substrate layer to have a thick layer at the concave portion and a thin layer at the convex portion. In these coating manners, a composition and concentration of the low viscosity fluid and a coating thickness before drying can be controlled, whereby, even if the surface of the coated film before drying is flat, the coated film after drying (the tackifier layer) can be shaped so as to have a desired concavo-convex surface of thick and thin layers at the concave and convex portions, respectively, which surface conforms to the concavo-convex form of the substrate layer. It can be applied to coat the takifier so as to obtain a coating thickness relatively thin such as from about 1 to 20 µm, which thickness is of after drying to remove the solvent.

After all, a preferred lamination structure among the concavo-convex films in accordance with the present invention is a combination of the following (a) and (b).

(a) The substrate layer (B) is a single layer or a laminate of the single layer with a core layer formed from a resin composition having a Vicat softening point higher than that of the surface layer of the substrate (the layer imparted with the concavo-convex form), wherein the single layer has a thickness of from about 10 to 50 µm, a sea-island patterned concavo-convex structure in which the convex portion (island) in a shape of polygonal conical trapezoid or the like is arranged in a staggered form or the like on the continuous concave portion (the sea), a ten-point average roughness of the concavo-convex on the substrate layer ($R_Z^{(B)}$) of from 5 to 50 µm, which is smaller than the thickness of the substrate layer ($B_{AV}$), and an average interval ($S_M^{(B)}$) of from about 10 to 500 µm.

(b) The tackifier layer (A) is a continuous layer formed into a sea-island structure comprising the sea of a high tackifying concave portion and an island of a low tackifying convex portion, wherein a thickness of the tackifier layer on the substrate layer is within a range of from about 1 to 20 µm, which is smaller than the concavo-convex height of the substrate layer ($R_Z^{(B)}$), provided that the thickness at the concave portion is about 2 times or more, preferably about 3 times or more, that at the convex portion, a ten-point average roughness of the concavo-convex on the surface of the tackifier layer ($R_Z^{(A)}$) is from 3 to 30 µm, which is smaller than the ten-point average roughness of the concavo-convex on the surface of the substrate layer ($R_Z^{(B)}$), and an average interval ($S_M^{(A)}$) is similar to that of the substrate layer ($S_M^{(B)}$).

Although the reason why both the adhesive sealing property and the drawing-out property can be satisfied at the same time according to the film in accordance with the present invention is not clear, it seems due to a property such that a 180° peeling strength (tackifying force at the time of peeling-off) depends upon the compressive strength applied to the tackifier layer and the thickness of the tackifier layer, and therefore the strength is exhibited from a low strength region to a high strength region with a positive correlation, and on the other hand, a shear peeling strength (tackifying force at the time of shearing) greatly depends upon the property of the tackifier layer itself (for example, a friction strength caused by a wetting property of the surface of the tackifier layer against the material to be bonded and others), and therefore the strength is effectively exhibited only at a high strength region.

By making the thickness of the tackifier layer thick and thin at the concave and convex portions, respectively, the 180° peeling strength corresponding to the tackifying force at the time of drawing out a rolled film can be decreased with decrease in the compressive strength, and as a result, no effect is given on the drawing-out of the film. On the other hand, when a high compressive strength is applied, the 180° peeling strength for the tackifying force at the time of over-wrapping becomes high, so that a sufficient sealing degree can be obtained. Further, by making the tackifier layer continuous, even when the 180° peeling strength exhibited under a high compressive strength is controlled (low or mean strength region) in order to improve the drawing-out property, the shear peeling strength having little effect on the drawing-out property is always exhibited at a high strength region, and as a result, the 180° peeling strength at the time of over-wrapping can be effectively supplemented, thereby obtaining a high adhesive sealing property.

While, it is recommendable to make the whole thickness of the concavo-convex film in accordance with the present invention from about 10 to 50 µm, preferably from 15 to 30 µm. When it is within such a range, the film is made proper-kneed, and as a result, the film is difficult to self-adhere when drawn out or wrapped on a vessel or the like, and moreover a suitable size can be obtained when the film is rolled round.

Further, it is recommendable to control the film in accordance with the present invention so as to have the following effects.

That is, it is recommendable that the tackifying force in terms of the 180° peeling strength F (unit: g/cm width) and the shear peeling strength T (unit: kg/cm$^2$) exhibited under the compressive strength P (unit: g/cm$^2$) applied vertically to the projected flat surface of the film has the following relation.

(I) When a low compressive strength, $0 \leq P \leq 10$, which corresponds to a rolling pressure of the rolled film received in a decorated box, is applied, the expressions, $0 \leq F_{(1)} < 10$ and $0 \leq T_{(1)} < 0.6$, are satisfied. Whereby, there in no problem on the drawing-out property, and there can be freed from an inconvenience such that the film adheres to each other, when cut and used for over-wrapping a vessel or the like.

(II) When a high compressive strength, $10 < P$, which corresponds to a pushing pressure at the time when users are over-wraping a vessel or the like in the film, is applied, the expressions, $F_{(1)} < F_{(2)} < 50$ and $T_{(1)} < T_{(2)} < 3$ are satisfied, (provided that each value of F and T attached with the numerical note (1) is a value at the time when the compressive strength is represented by $0 \leq P \leq 10$, and that attached with the numerical note (2) is a value when $10 < P$). Whereby, a sufficient adhesion property can be exhibited without detriment to a satisfactory drawing-out property. In order to obtain the above-mentioned range, it is recommendable to use a tackifier capable of exhibiting a tackifying force of from about 150 to 300 g/cm in terms of the 180° peeling strength at the time when the above-mentioned preferred tackifier has a thickness of about 20 µm in the preferred lamination structure mentioned above, i.e. the above-mentioned combination of (a) and (b).

Furthermore, a sufficient visual recognizability of wrapped goods can be attained by using those having a satisfactory transparency, wherein either the substrate layer itself before imparting the concavo-convex form or the tackifier itself of about 20 µm in its thickness exhibits a clouding degree (Haze) of from more than 0% to less than 50%.

An evaluation method used in the present invention is as follows.

Adhesive Sealing Property

This method is to evaluate adhesion between a wrapping film and glass on the assumption that food is packaged with a wrapping film in a kitchen of room temperature (23° C., relative humidity 65%).

Tackifying Force

Figure 10:
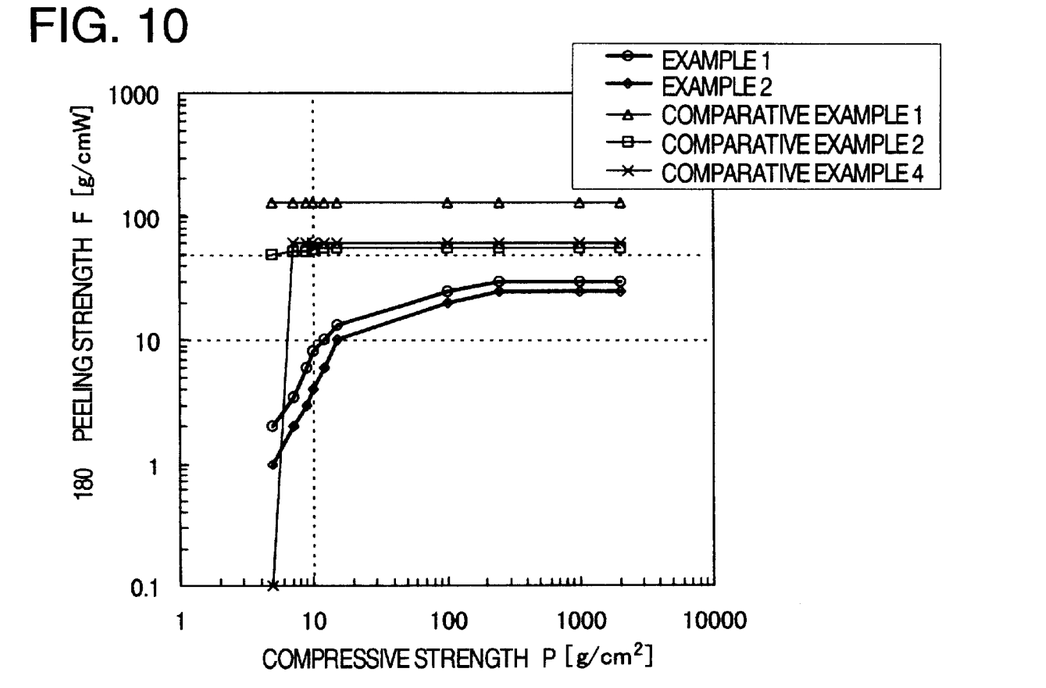
FIG. 10 is a view showing a relation between a 180° peeling strength and a compressive strength in Examples and Comparative Examples in the present invention.
Figure 11:
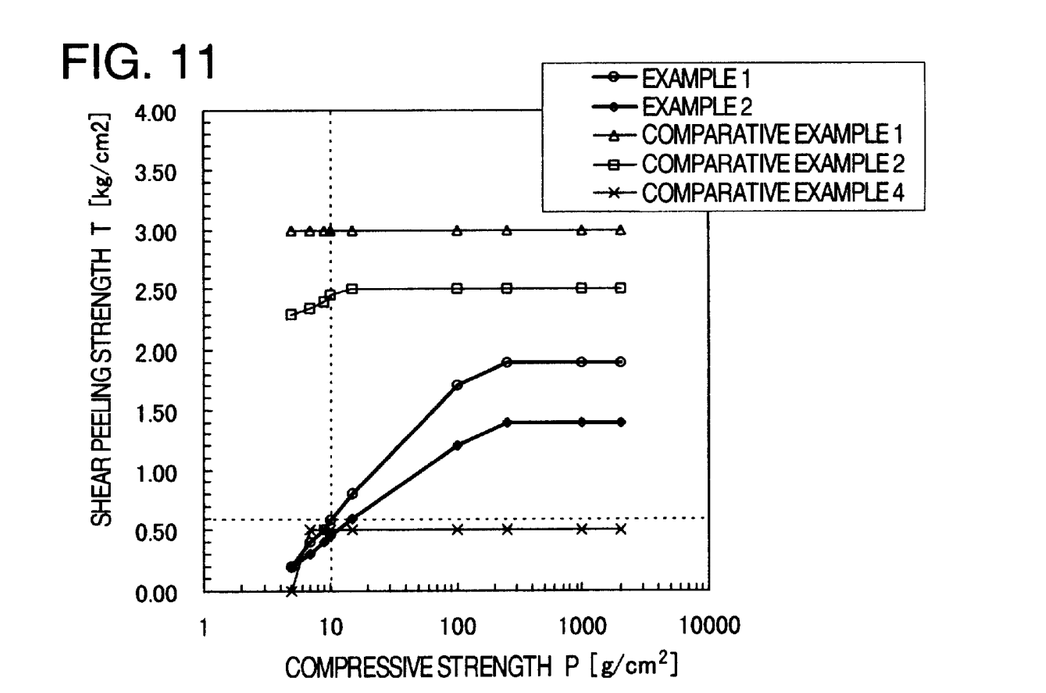
FIG. 11 is a view showing a relation between a shear peeling strength and a compressive strength in Examples and Comparative Examples in the present invention.

The test was carried out according to JIS-Z-0237 in a manner such that a test piece of a wrapping film prepared by cutting a sample into a size of 20 mm width×150 mm length, followed by storing for 7 days at room temperature (23° C., relative humidity 65%) was softly affixed to a cleaned flat glass plate (borosilicate glass, a trade name of Pyrex) of 2 nm or less in an arithmetic mean roughness Ra measured according to JIS-B0660, a load corresponding to a compressive strength of either 5 g/cm$^2$-test piece (corresponding to a low compressive strength, the attached numerical note (1)) or 2 kg/cm$^2$-test piece (corresponding to a high compressive strength, the attached numerical note (2)) was applied on the test piece, thereafter a region of 20 mm width×50 mm length in the test piece was subjected to press-adhesion as it was, after allowing to stand for 30 minutes, the load was removed, and then using a tension tester, a 180° peeling strength F (unit: g/cm width) and a shear (0°) peeling strength T (unit: kg/cm$^2$) were measured at a peeling rate of 300 mm/min, followed by the following evaluation. The 180° peeling strength F and shear (0°) peeling strength T were expressed in terms of values per measured width and area of the test piece, respectively. In addition, both the 180° peeling strength and shear peeling strength were similarly measured by changing loads corresponding to compressive strengths of 5 g~2 kg/cm$^2$, respectively, and results obtained are as shown in FIG. 10 and FIG. 11.

Evaluation Criteria

| Evaluation sign | Tackifying force and criterion |
| --- | --- |
| ◎ | $0 \leq F_{(2)} < 10 \leq F_{(2)} < 50$ and $0 \leq T_{(1)} < 0.6 \leq T_{(2)} < 3$<br>Superior level of satisfied tackifying force-exhibiting region |
| ○ | $0 \leq F_{(1)} < 10 \leq F_{(2)} < 50$ and $0 \leq T_{(1)} < T_{(2)} < 0.6$<br>Practical level of favorable tackifying force-exhibiting region |
| Δ | $10 \leq F_{(1)} \leq F_{(2)} < 50$ and $0.6 \leq T_{(1)} \leq T_{(2)} < 3$<br>High in tackifying force-exhibiting region at the time of low compressive strength and practical use questionable |
| X | $50 \leq F_{(2)}$ or $3 \leq T_{(2)}$<br>Very high tackifying force and practical use impossible |

Liquid Sealing Property

A test piece of a 15 cm square wrapping film sampled was covered on an opening portion of a commercially available cylindrical paper cup for a drink of 7 cm opening portion diameter×7 cm height, in which 100 g of water was placed, in a manner like enveloping it, a neighborhood of the opening portion of the paper cup and an outer side surface thereof were pressed by hand to perform adhesion with the tackifier layer side of the test piece, the paper cup was slanted so as to direct down the opening portion thereof by 180° for 10 seconds (once) and then returned to the former state so as to direct up the opening portion thereof, and immediately thereafter the state of the paper cup was observed and the state of the test piece at the time of peeling off by hand from the paper cup (at the time of peeling) was observed to evaluate as follows.

Evaluation Criteria

| Evaluation sign | Criterion |
| --- | --- |
| ○ | The test piece was not peeled from the paper cup and no water was leaking out, and at the time of peeling the wrapping film was not broken. |
| X | The test piece was partially peeled from the paper cup and water was leaking out, or at the time of peeling the wrapping film was extraordinarily stretched or broken. |

Drawing-Out Property

Figure 2:
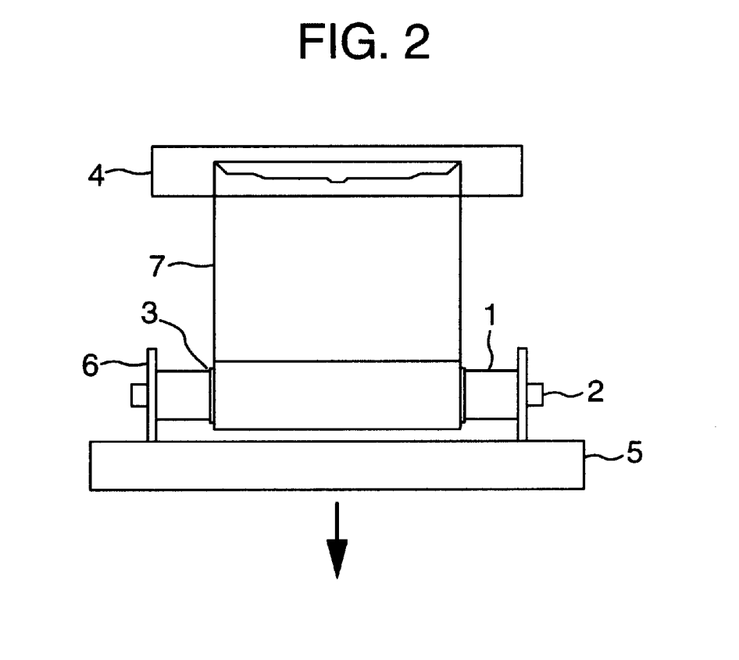
FIG. 2 is a schematic front view showing a measurement method of drawing-out property.

A bearing system free roll consisting of a moving portion of about 31 cm length and about 3.6 cm diameter (numeral 1 in FIG. 2) and a support shaft of 33 cm length (numeral 2 in FIG. 2) was inserted into a paper tube of about 31 cm length and about 4.1 cm diameter (numeral 3 in FIG. 2), round which paper tube a wrapping film was rolled, so as to match a center in a width direction of a rolled wrapping film (30 cm width×20 m length, rolled round the paper tube) and a center in a length direction of the moving portion of the free roll, thereby integrating with each other. The free roll integrated with the rolled wrapping film was installed in an all-purpose tensile compression test machine TCM-200 manufactured by Shinko Tsushin Kogyo K. K. in a manner such that the shaft (numeral 2 in FIG. 2) was fixed to a bearing (numeral 6 in FIG. 2) set in a lower-moving means (numeral 5 in FIG. 2) of the lower part of said test machine so as to keep a hanger (numeral 4 in FIG. 2) hanging from the side of a load cell of said test machine parallel with the support shaft (numeral 2 in FIG. 2) and make the center in a width direction of the rolled wrapping film positioned in a vertical direction of the hanger (numeral 4 in FIG. 2), and then the wrapping film (numeral 7 in FIG. 2) integrated with the free roll was peeled and fixed using a double-sided tape in a crease-free manner to the hanger (numeral 4 in FIG. 2) hanging from the side of a load cell of said test machine. Thereafter, in a thermostat of 23° C., the lower-moving means (numeral 5 in FIG. 2) of the above-mentioned test machine was drawn down at a rate of 1000 mm/min to vertically peel off the wrapping film (numeral 7 in FIG. 2) from the paper tube (numeral 3 in FIG. 2). Then, a peak value of the force required for peeling off the wrapping film from the paper tube was regarded as a measurement value of drawing-out property (unit: g/30 cm width), which was evaluated as follows.

Evaluation Criteria

| Evaluation sign | Peak value | Criterion |
| --- | --- | --- |
| ◎ | not more than 65 | Superior level of satisfactory drawing-out property |
| ○ | more than 65 and not more than 80 | Practical level of favorable drawing-out property |

-continued

| Evaluation sign | Peak value | Criterion |
| --- | --- | --- |
| Δ | more than 80 and not more than 100 | Inferior drawing-out property and practical use questionable |
| X | more than 100 | Remarkably inferior drawing-out property and practical use impossible |

Transparency

A clouding degree(Haze, unit: %) of a wrapping film unrolled from the rolled wrapping film was measured according to ASTM-D-1003, and transparency of the film was evaluated using a six-point average value (round to the nearest whole number) to know a visual recognizability of wrapped goods as follows.

Evaluation criteria

| Evaluation sign | Haze | Criterion |
| --- | --- | --- |
| ⊚ | less than 25% | Very superior transparency and wrapped goods are very visible. |
| ○ | not less than 25% but less than 50% | Superior transparency and a form of wrapped goods is recognizable. |
| Δ | not less than 50% but less than 70% | Inferior transparency and a form of wrapped goods becomes dim. |
| X | not less than 70% | Bad transparency and a form of wrapped goods is not visible. |

Combined Evaluation

An index of combined evaluation results relating to the above-mentioned adhesive sealing property, drawing-out property and transparency is as shown below.

Evaluation Criteria

| Evaluation sign | Criterion |
| --- | --- |
| ○ | In the case of not having X and Δ but ○ or ⊚ , and the problem to be solved can be solved at a high level. |
| Δ | In the case of not having X but Δ, and it is hard to say that the problem to be solved is solved. |
| X | In the case of having X, and the problem to be solved is not solved. |

The film in accordance with the present invention has the following effects (1) to (3).

(1) When a thickness of the tackifier layer is from about 1 to 20 μm, a tackifying force corresponding to strength of peeling the film is expressed by a 180° peeling strength. The 180° peeling strength greatly depends upon both the thickness of the tackifier layer and a compressive strength, so that either a low tackifying property or a high tackifying property can be exhibited. On the other hand, a tackifying force corresponding to strength of shearing the film is expressed by a shear peeling strength. Even when the compressive strength is low (about 5 g/cm²) and the thickness of the tackifier layer is small (about 1 μm), the shear peeling strength is to exhibit a tackifying property as high as exceeding about 0.2 kg/cm².

(2) By forming the tackifier layer on the surface of the film in a manner such that the surface is formed into a sea-island structure, in which a convex portion of polygonal conical trapezoid arranged in a parallel or staggered form serves as the island, and a continuous concave portion serves as the sea, and the tackifier layer is formed so as to be thin at the convex portion and thick at the concave portion, a contacting state between a material to be bonded and the tackifier layer varies depending upon a degree of the compressive strength either microscopically or macroscopically, and as a result, the tackifying force expressed by the 180° peeling strength can be effectively varied from a low tackifying property to a high tackifying property.

(3) In the case where the tackifier layer present on the concavo-convex of the substrate layer is not a continuous layer, it may happen that a transparency is deteriorated by scattering of light and a clouding degree (Haze) which is an index of transparency of the film largely exceeds 50%. Further, it may happen that a shear peeling strength is weakened and a space is formed to cause a liquid leakage, so that an adhesive sealing property is deteriorated. Even if the tackifier layer is a continuous layer, provided that a thickness of the tackifier layer is larger than a ten-point average roughness of the concavo-convex of the substrate layer ($R_Z^{(B)}$), although transparency can be improved, a drawing-out property is deteriorated because the 180° peeling strength becomes too much. Furthermore, even if a thickness of the tackifier layer is smaller than a ten-point average roughness of the concavo-convex of the substrate layer ($R_Z^{(B)}$), provided that the thickness of the tackifier layer at the convex portion is similar to that at the concave portion (the surface roughness of the concavo-convex of the tackifier layer is similar to that of the convex portion), it is apt that transparency is insufficiently improved, thereby resulting in a clouding degree (Haze) of 50% or more.

According to the present invention satisfying the above-mentioned structure, there can be obtained a wrapping film for household use, which is used for simply wrapping foods or the like, which has both a satisfactory adhesive sealing property, so that even in the case of a vessel in which a liquid is put, little leakage of the content occurs, and a satisfactory drawing property, and which is superior in its visual recognizability of a content (transparency of the film). Thus, the present invention is remarkably significant on practical use.

The present invention is explained in detail with reference to Examples as follows.

EXAMPLE 1

A three layered film (a total thickness: about 20 μm) of a layer of high density polyethylene (hereinafter referred to as HDPE, NOVATEC, manufactured by Japan Polychem Corporation: about 8 μm thickness), a layer of ethylene-vinyl alcohol copolymer (hereinafter referred to as EVOH, SOARNOL manufactured by The Nippon Synthetic Chemical Industry Co., Ltd.: about 4 μm thickness) and a layer of high density polyethylene (hereinafter referred to as HDPE, NOVATEC, manufactured by Japan Polychem Corporation: about 8 μm thickness), produced as a substrate layer with use of a T die cast was passed through between a heated 200 mesh metal-made trapezoidal cup roller (pitch: about 125 μm, line width: about 25 μm, depth: about 45 μm) and a rubber-made back-up roller brought into press contact therewith, thereby obtaining a film, on one side surface (I) of which there was formed a sea-island structure in which a convex portion of a tetragonal conical trapezoid shape arranged in a staggered form constituted the island and the concave portion constituted the continuous sea. A ten-point average roughness of the concavo-convex surface on the film of the substrate layer and an average interval were found to be about 10 μm and about 120 μm, respectively.

Figure 3:
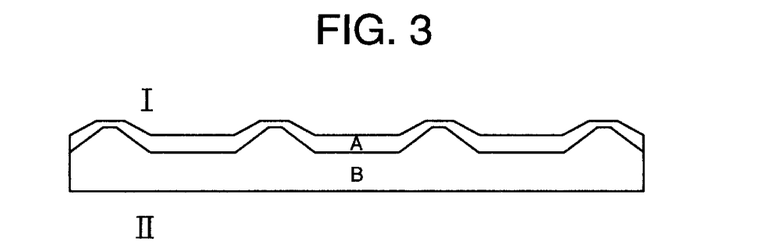
FIG. 3 is a conceptual view showing respective cross sections of the concavo-convex films obtained in Example 1 and Example 4 in accordance with the present invention.

Successively, a tackifier (solid content: 20%) prepared by dissolving a mixture of styrene butadiene rubber (SBR, TAFPRENE manufactured by Asahi Chemical Industry Co., Ltd.), C9 petroleum resin (ARKON manufactured by Arakawa Chemical Industries, Ltd.) and paraffin oil (DIANA PROCESS OIL manufactured by Idemitsu Kosan Co., Ltd.) in a weight ratio of 53/40/7 in toluene was coated on the side of the above-mentioned HDPE concavo-convex surface (one side surface I) with use of a reverse coater and dried to form a tackifier layer having respective thickness of about 7 μm at the concave portion of HDPE and about 2 μm at the convex portion thereof, a ten-point average roughness of the concavo-convex surface on the tackifier layer of about 5 μm and an average interval of about 120 μm, thereby obtaining a concavo-convex film as shown in FIG. 3.

EXAMPLE 2

Figure 4:
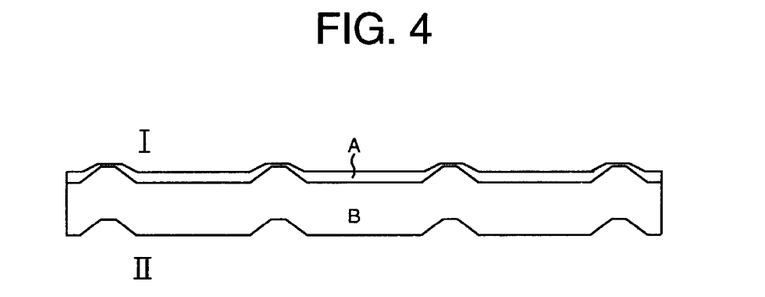
FIG. 4 is a conceptual view showing respective cross sections of the concavo-convex films obtained in Example 2 and Example 5 in accordance with the present invention.

A single layer film (thickness: about 20 μm) produced as a substrate layer from high density polyethylene (hereinafter referred to as HDPE, NOVATEC, manufactured by Japan Polychem Corporation) with use of a T die cast was used and passed through between a heated 200 mesh metal-made trapezoidal cup roller (pitch: about 125 μm, line width: about 25 μm, depth: about 45 μm) and a rubber cup roller brought into press contact therewith so as to mold a concavo-convex form on both surfaces of the film, one side surface (I) of which had a sea-island structure in which a convex portion of a tetragonal conical trapezoid shape arranged in a staggered form constituted the island and the concave portion constituted the continuous sea, and the other side surface (II) of which had the concavo-convex form conforming to that of the reverse surface (I). A ten-point average roughness of the concavo-convex surface on the HDPE itself and an average interval were found to be about 8 μm and about 120 μm, respectively. Successively, a tackifier (solid content: 20%) prepared by dissolving a mixture of styrene butadiene rubber (SBR, TAFTEC manufactured by Arakawa Chemical Industries, Ltd.), C9 petroleum resin (ARKON manufactured by Arakawa Chemical Industries, Ltd.) and paraffin oil (DIANA PROCESS OIL manufactured by Idemitsu Kosan CO., Ltd.) in a weight ratio of 53/40/7 in toluene was coated on the side of the HDPE concavo-convex surface (one side surface I) with use of a reverse coater and dried to form a tackifier layer having respective thickness of about 6 μm at the concave portion of HDPE and about 1 μm at the convex portion thereof, a ten-point average roughness of the concavo-convex surface on the tackifier layer of about 3 μm and an average interval of about 120 μm, thereby obtaining a concavo-convex film as shown in FIG. 4.

EXAMPLE 3

Figure 5:
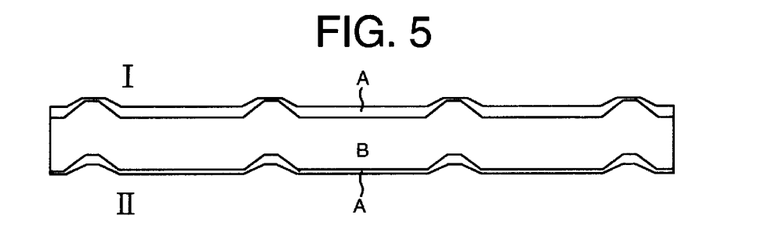
FIG. 5 is a conceptual view showing a cross section of the concavo-convex film obtained in Example 3 in accordance with the present invention.

On both concavo-convex surfaces (both surfaces I and II) of the HDPE substrate layer obtained in Example 2, which layer had the concavo-convex formed on both surfaces of the film of about 5 μm in the ten-point average roughness and about 120 μm in the average interval, the tackifier used in Example 2 was coated with use of a both surface coating reverse roll coater and dried to form a tackifier layer having respective thickness of about 3 μm at the concave portion of HDPE and about 1 μm at the convex portion thereof, a ten-point average roughness of the concavo-convex surface on the tackifier layer of about 3 μm and an average interval of about 120 μm on both surfaces thereof, thereby obtaining a concavo-convex film as shown in FIG. 5.

EXAMPLE 4

A three layered laminate film (a total thickness: about 20 μm) of a film of high density polyethylene (hereinafter referred to as HDPE, NOVATEC, manufactured by Japan Polychem Corporation: about 8 μm thickness), a film of ethylene-vinyl alcohol copolymer (hereinafter referred to as EVOH, SOARNOL manufactured by The Nippon Synthetic Chemical Industry CO., Ltd.: about 4 μm thickness) and a film of high density polyethylene (hereinafter referred to as HDPE, NOVATEC, manufactured by Japan Polychem Corporation: about 8 μm thickness), produced as a substrate layer with use of a T die cast was passed through between a heated 100 mesh metal-made trapezoidal cup roller (pitch: about 260 μm, line width: about 25 μm, depth: about 100 μm) and a rubber cup roller brought into press contact therewith, thereby obtaining a film, on one side surface (I) of which there was formed a sea-island structure in which a convex portion of a tetragonal conical trapezoid shape arranged in a staggered form constituted the island and the concave portion constituted the continuous sea. A ten-point average roughness of the concavo-convex surface on the film of the substrate layer and an average interval were found to be about 14 μm and about 250 μm, respectively. Successively, the tackifier used in Example 2 was coated on the side of the above-mentioned HDPE concavo-convex surface (one side surface I) with use of a reverse coater and dried to form a tackifier layer having respective thickness of about 10 μm at the concave portion of HDPE and about 2 μm at the convex portion thereof, a ten-point average roughness of the concavo-convex surface on the tackifier layer of about 6 μm and an average interval of about 250 μm, thereby obtaining a concavo-convex film as shown in FIG. 3.

EXAMPLE 5

A single layer film (thickness: about 50 μm) produced as a substrate layer from high density polyethylene (hereinafter referred to as HDPE, NOVATEC, manufactured by Japan Polychem Corporation) with use of a T die cast was used and passed through between a heated 100 mesh metal-made trapezoidal cup roller (pitch: about 260 μm, line width: about 25 μm, depth: about 100 μm) and a paper roller brought into press contact therewith so as to mold a concavo-convex form on both surfaces of the film, one side surface (I) of which had a sea-island structure in which a convex portion of a tetragonal conical trapezoid shape arranged in a staggered form constituted the island and the concave portion constituted the continuous sea, and the other side surface (II) of which had the concavo-convex form conforming to that of the reverse surface (I). A ten-point average roughness of the concavo-convex surface on the HDPE itself and an average interval were found to be about 40 μm and about 250 μm, respectively. Successively, the tackifier used in Example 2 was coated on the side of the above-mentioned HDPE concavo-convex surface (one side surface I) with use of a reverse coater and dried to form a tackifier layer having respective thickness of about 12 μm at the concave portion of HDPE and about 2 μm at the convex portion thereof, a ten-point average roughness of the concavo-convex surface on the tackifier layer of about 30 μm and an average interval of about 250 μm, thereby obtaining a concavo-convex film as shown in FIG. 4.

Comparative Example 1

Figure 6:
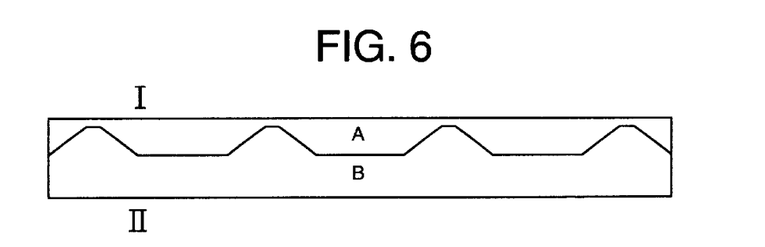
FIG. 6 is a conceptual view showing a cross section of the concavo-convex film obtained in Comparative Example 1 in the present invention.

Example 1 was repeated, except that the tackifier layer was formed so as to make a thickness at the concave portion of the substrate layer more than the maximum height at the convex portion of the substrate layer, thereby forming the tackifier layer having respective thickness of about 11 μm at the HDPE concave portion and about 2 μm at the convex portion, a ten-point average roughness of the concavo-convex on the surface of the tackifier layer of about 1 μm, and an average interval of about 120 μm. As a result, a concavo-convex film as shown in FIG. 6 was obtained.

Comparative Example 2

Figure 7:
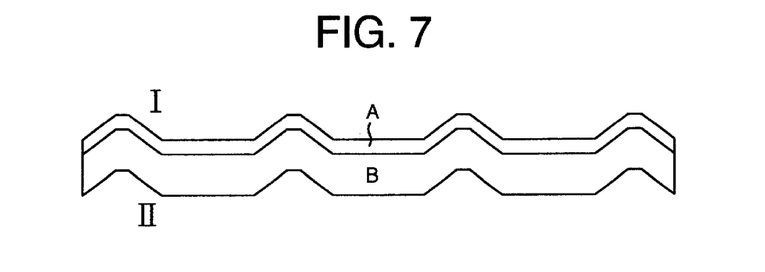
FIG. 7 is a conceptual view showing a cross section of the concavo-convex film obtained in Comparative Example 2 in the present invention.

A film (substrate layer thickness of about 20 μm, tackifier layer thickness of about 6 μm), which had been prepared by coating the tackifier used in Example 2 on the surface of HDPE film of the substrate layer used in Example 2 (one side surface I), followed by drying, was passed through between a heated 200 mesh metal-made trapezoidal cup roller (pitch: about 125 μm, line width: about 25 μm, depth: about 45 μm) and a rubber cup roller brought into press contact therewith so as to mold a concavo-convex form on both surfaces of the film, one side surface (I) of which had a sea-island structure in which a convex portion of a tetragonal conical trapezoid shape arranged in a staggered form constituted the island and the concave portion constituted the continuous sea, and the other side surface (II) of which had the concavo-convex form conforming to that of the reverse surface (I). There was obtained a concavo-convex film as shown in FIG. 7, which had a ten-point average roughness of the concavo-convex surface on the HDPE itself of about 8 μm, an average interval of about 120 μm, a thickness of the tackifier layer, which was equally about 6 μm both at the concave portion and the convex portion, a ten-point average roughness of the concavo-convex surface on the tackifier layer of about 8 μm, and an average interval of about 120 μm.

Comparative Example 3

Figure 8:
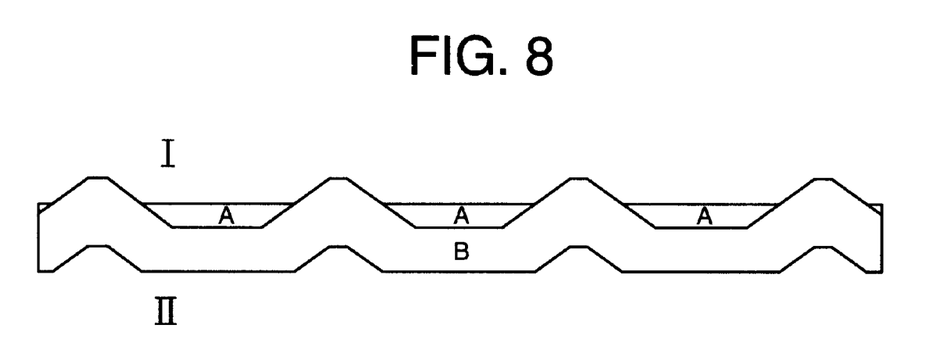
FIG. 8 is a conceptual view showing a cross section of the concavo-convex film obtained in Comparative Example 3 in the present invention.

A solution obtained by heat-dissolving the tackifier of Example 2 was transferred on a convex line of a heated 100 mesh metal-made trapezoidal cup roller (pitch: about 260 μm, line width: about 25 μm, depth: about 100 μm) with use of a gravure roll, and thereafter a single layer film (thickness: about 20 μm) produced as a substrate layer from high density polyethylene (hereinafter referred to as HDPE, NOVATEC, manufactured by Japan Polychem Corporation) with use of a T die cast was passed through between the cup roller and a paper roller brought into press contact therewith so as to mold a concavo-convex form on both surfaces of the film, one side surface (I) of which had a sea-island structure in which a convex portion of a tetragonal conical trapezoid shape arranged in a staggered form constituted the island and the concave portion constituted the continuous sea, and the other side surface (II) of which had the concavo-convex form conforming to that of the reverse surface (I). In such a manner, the concavo-convex formation on both surfaces of the film and the transfer of the tackifier were effected at the same time. There was obtained a concavo-convex film as shown in FIG. 8, which had a ten-point average roughness of the concavo-convex surface on the HDPE itself of about 16 μm, an average interval of about 250 μm, a thickness of the tackifier layer of about 10 μm, which was formed only at the HDPE concave portion, a ten-point average roughness of the tackifier layer-carrying concavo-convex surface of about 6 μm, and an average interval of about 250 μm.

Comparative Example 4

Figure 9:
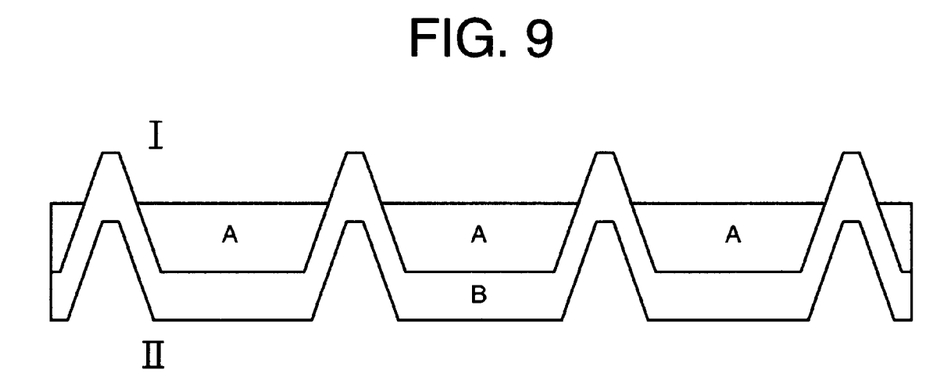
FIG. 9 is a conceptual view showing a cross section of the concavo-convex film obtained in Comparative Example 4 in the present invention.

A solution obtained by heat-dissolving the tackifier of Example 2 was transferred on a convex line of a heated 100 mesh metal-made trapezoidal cup roller (pitch: about 260 μm, line width: about 25 μm, depth: about 100 μm) with use of a gravure roll, and thereafter a single layer film (thickness: about 8 μm) produced as a substrate layer from high density polyethylene (hereinafter referred to as HDPE, NOVATEC, manufactured by Japan Polychem Corporation) with use of a T die cast was passed through between the cup roller and a paper roller brought into press contact therewith so as to mold a concavo-convex form on both surfaces of the film, one side surface (I) of which had a sea-island structure in which a convex portion of a tetragonal conical trapezoid shape arranged in a staggered form constituted the island and the concave portion constituted the continuous sea, and the other side surface (II) of which had the concavo-convex form conforming to that of the reverse surface (I). In such a manner, the concavo-convex formation on both surfaces of the film and the transfer of the tackifier were effected at the same time. There was obtained a concavo-convex film as shown in FIG. 9, which had a ten-point average roughness of the concavo-convex surface on the HDPE itself of about 40 μm, an average interval of about 250 μm, a thickness of the tackifier layer of about 10 μm, which was formed only at the HDPE concave portion, a ten-point average roughness of the tackifier layer-carrying concavo-convex surface of about 30 μm, and an average interval of about 250 μm.

The results of evaluation about the adhesive sealing property, drawing-out property and transparency of respective films obtained above were as shown in Table 1.

The results of Table 1 demonstrate that the concavo-convex films in accordance with the present invention (Examples 1 to 5) are satisfactory in their adhesive sealing property, that is, their tackifying force, and in their liquid sealing property free from water leakage from a vessel in which a liquid substance is put, at the same time, satisfactory in their drawing-out property of a rolled film, and superior in their transparency. On the other hand, the films of Comparative Examples 1 and 2 are difficult to attain both the adhesive sealing property and the drawing-out property at the same time, that of Comparative Example 3 is inferior in its liquid sealing property and its transparency, and that of Comparative Example 4 is inferior in its drawing-out property and its transparency.

Moreover, the results in FIG. 10 and FIG. 11 demonstrate that those of Examples in accordance with the present invention can exhibit performance of gradually increasing their peeling strength depending upon the compressive strength, thereby keeping a high shear peeling strength even when the 180° peeling strength is relatively low, so that both the drawing-out property and the adhesive sealing property can be easily attained to a practical level at the same time, even when, for example, a rolling pressure is increased due to a long film length in the rolled film and corresponds to a compressive strength exceeding 10 g/cm$^2$.

TABLE 1

|  |  | Example | | | | | Comparative Example | | | |
| --- | --- | --- | --- | --- | --- | --- | --- | --- | --- | --- |
|  |  | 1 | 2 | 3 | 4 | 5 | 1 | 2 | 3 | 4 |
| Substrate layer | Height of convex portion $R_Z^{(B)}$ | 10 | 8 | 5 | 14 | 40 | 10 | 8 | 16 | 40 |
|  | Interval of concavo-convex $S_M^{(B)}$ | 120 | 120 | 120 | 250 | 250 | 120 | 120 | 250 | 250 |
|  | Thickness | 20 | 20 | 20 | 20 | 50 | 20 | 20 | 20 | 10 |

TABLE 1-continued

| | | Example | | | | | Comparative Example | | | |
|---|---|---|---|---|---|---|---|---|---|---|
| | | 1 | 2 | 3 | 4 | 5 | 1 | 2 | 3 | 4 |
| Substrate layer + Tackifier layer | Height of convex portion $R_Z^{(A)}$ | 5 | 3 | 3 | 6 | 30 | 1 | 8 | 6 | 20 |
| | Interval of concavo-convex $S_M^{(A)}$ | 120 | 120 | 120 | 250 | 250 | 120 | 120 | 250 | 250 |
| | Thickness of convex portion $A_{min}$ | 2 | 1 | 1 | 2 | 2 | 2 | 6 | 0 | 0 |
| | Thickness of concave portion $A_{max}$ | 7 | 6 | 3 | 10 | 12 | 11 | 6 | 10 | 20 |
| Adhesive sealing property | Tackifying force | ◉ | ◉ | ◉ | ◉ | ◉ | X | X | ○ | X |
| | $F_{(1)}/F_{(2)}$ | 2/30 | 1/25 | 1/15 | 3/30 | 3/20 | 130/130 | 50/55 | 0/20 | 0/60 |
| | $T_{(1)}/T_{(2)}$ | 0.2/1.9 | 0.2/1.4 | 0.2/1.2 | 0.2/2.0 | 0.2/1.9 | 3.0/3.0 | 2.3/2.5 | 0/0.3 | 0/0.5 |
| | Liquid sealing property | ○ | ○ | ○ | ○ | ○ | X | ○ | X | ○ |
| Drawing-out property | | ○ | ◉ | ○ | ○ | ○ | X | X | ◉ | Δ |
| | | 67 | 60 | 77 | 70 | 75 | 200 | 120 | 55 | 100 |
| Transparency | | ◉ | ○ | ◉ | ○ | ○ | ◉ | Δ | X | X |
| | | 20 | 30 | 22 | 40 | 47 | 15 | 60 | 75 | 85 |
| Combined evaluation | | ○ | ○ | ○ | ○ | ○ | X | X | X | X |

What is claimed is:

1. An adhesive wrapping film having a continuous tackifier layer (A) on at least one side surface of a substrate layer (B) whose surface has a concavo-convex form, wherein a thickness of the tackifier layer at the concave portion of the substrate layer is larger than that at the convex portion of the substrate layer, and a thickness of the substrate layer $B_{AV}$, a thickness of the tackifier layer at the concave portion of the substrate layer $A_{max}$, a ten-point average roughness of the surface of the tackifier layer corresponding to a height of the convex portion of the tackifier layer $R_Z^{(A)}$, and a ten-point average roughness of the surface of the substrate layer corresponding to a height of the convex portion of the substrate layer $R_Z^{(B)}$ satisfy a relation of the following conditional expressions (1) and (2):

(1) $A_{max} < R_Z^{(B)} < B_{AV}$ (2) $R_Z^{(A)} < R_Z^{(B)}$.

2. The adhesive wrapping film according to claim 1, wherein the $R_Z^{(A)}$ and $R_Z^{(B)}$ and an average interval of a convex portion of the substrate layer $S_M^{(B)}$ satisfy a relation of the following conditional expressions (1) to (3):

(1) $3 \mu m \leq R_Z^{(A)} \leq 30 \mu m$ (2) $5 \mu m \leq R_Z^{(B)} \leq 50 \mu m$ (3) $10 \mu m \leq S_M^{(B)} \leq 500 \mu m$.

3. The adhesive wrapping film according to any one of claim 1 or 2, wherein the concavo-convex surface of the substrate layer has a sea-island pattern wherein islands of the convex portion in a polygonal conical shape are arranged on the sea of the concave portion in a parallel or staggered form.

4. The adhesive wrapping film according to claim 3, wherein the substrate layer has the concavo-convex on both side surfaces thereof.

5. The adhesive wrapping film according to claim 3, wherein the substrate layer is a laminate comprising a concavo-convex surface-carrying layer and a core layer, wherein a Vicat softening point of a resin constituting the core layer is higher than a Vicat softening point of a resin of the concavo-convex surface-carrying layer.

6. The adhesive wrapping film according to claim 3, wherein a peeling strength of the film has a contact pressure reliability.

7. The adhesive wrapping film according to claim 6, wherein a relation among a compressive strength P (unit: g/cm²) applied from a direction vertical to a projected flat plane of the film, a 180° peeling strength F (unit: g/cm width) exhibited by the compressive strength P, and a shear peeling strength T (unit: kg/cm²) satisfies a relation of the following conditional expressions (1) and (2):

(1) when $023 P \leq 10$, $0 \leq F_{(1)} 21\ 10$ and $0 \leq T_{(1)} 21\ 0.6$ (2) when $10 < P$, $F_{(1)} < F_{(2)} 21\ 50$ and $T_{(1)} < T_{(2)} < 3$, wherein the F and T attached with the numerical note (1) stand for respective values when the compressive strength is represented by $0 \leq P \leq 10$, and those attached with the numerical note (2) when the compressive strength is represented by $10 < P$.

8. The adhesive wrapping film according to claim 7, wherein a clouding degree (Haze) of the film is more than 0% and less than 50%.

9. An article comprising the adhesive wrapping film according to claim 8, wherein said adhesive wrapping film is rolled round and received in a decorated box equipped with a cutting blade.

10. The adhesive wrapping film-comprising article according to claim 9, wherein the film is for household use.

* * * * *